(12) United States Patent
Cole

(10) Patent No.: US 7,498,175 B2
(45) Date of Patent: *Mar. 3, 2009

(54) METHOD AND APPARATUS FOR DETERMINING TEMPERATURE OF AND CONTROLLING THE EVAPORATION OF LIQUID SAMPLES

(75) Inventor: Michael Cole, Saxmundham (GB)

(73) Assignee: Genevac Limited, Ipswich (GB)

( * ) Notice: Subject to any disclaimer, the term of this patent is extended or adjusted under 35 U.S.C. 154(b) by 951 days.

This patent is subject to a terminal disclaimer.

(21) Appl. No.: 10/917,187

(22) Filed: Aug. 10, 2004

(65) Prior Publication Data

US 2005/0048668 A1 Mar. 3, 2005

Related U.S. Application Data

(60) Continuation of application No. 09/997,154, filed on Nov. 28, 2001, now Pat. No. 6,878,342, which is a division of application No. 09/508,215, filed on Mar. 8, 2000, now Pat. No. 6,605,474.

(51) Int. Cl.
*G01N 1/18* (2006.01)
*G01N 35/00* (2006.01)
*G01N 9/30* (2006.01)
*G01N 21/00* (2006.01)

(52) U.S. Cl. ............... 436/177; 422/72; 422/64; 422/67; 422/82.05; 159/6.1; 159/44; 159/47.1; 159/DIG. 6; 436/45; 34/315

(58) Field of Classification Search ............. 436/177; 422/67, 68.1, 72, 64, 99–100; 159/6.1, 44, 159/47.1, DIG. 6

See application file for complete search history.

(56) References Cited

U.S. PATENT DOCUMENTS 5,137,604 A * 8/1992 Meeks et al. ............... 202/205
5,154,896 A * 10/1992 Mochida et al. ............ 422/209
5,217,572 A * 6/1993 Guy et al. ................... 159/6.1

(Continued)

*Primary Examiner*—Brian R. Gordon
(74) *Attorney, Agent, or Firm*—Barnes & Thornburg LLP

(57) ABSTRACT

A method is described for evaporating liquid samples contained in sample holders mounted within a chamber and rotated by the rotor during an evaporation process in which the pressure in the chamber is reduced below atmospheric and the sample holders are rotated at high speed so as to exert centrifugal force on the contents of the holders. Heat is supplied to elevate the temperature of the liquid component of the samples to assist in the evaporation process. The temperature of the sample material is continuously or regularly monitored during the evaporation process and temperature signals are transmitted to a remote computing means which is programmed to generate a control signal for controlling the supply of heat to the samples and controlling the evaporation process. The temperature may be sensed by a probe in a sample holder containing an evaporating liquid sample, or in an adjoining sample holder containing a buffer liquid. The rotational speed is also sensed and a speed signal conveyed to the computing means. In an alternative method the rate of flow of vapor from the chamber is monitored and a flow rate signal is computed which is also supplied to the computer means and the evaporation process is controlled in relation to the value of the vapor flow rate signal. Improved methods of heating and means for supporting sample holders which are to be heated, to achieve more uniform heating thereof, within an evaporating chamber, are described. Apparatus for performing the various methods is also described.

44 Claims, 7 Drawing Sheets

U.S. PATENT DOCUMENTS

| | | | | |
|---|---|---|---|---|
| 5,219,526 A | * | 6/1993 | Long | 422/64 |
| 5,858,178 A | * | 1/1999 | Lautenschlager | 203/73 |
| 6,096,271 A | * | 8/2000 | Bogen et al. | 422/64 |
| 6,096,272 A | * | 8/2000 | Clark et al. | 422/64 |
| 6,110,426 A | * | 8/2000 | Shalon et al. | 422/68.1 |
| 6,605,474 B1 | * | 8/2003 | Cole | 436/177 |
| 2001/0019702 A1 | * | 9/2001 | Watari et al. | 422/67 |
| 2002/0025579 A1 | * | 2/2002 | Odakura et al. | 436/46 |
| 2002/0114733 A1 | * | 8/2002 | Copeland et al. | 422/64 |
| 2003/0066797 A1 | * | 4/2003 | Sasaki | 210/511 |

* cited by examiner

STRONG INFRA-RED RADIATION FROM ABOVE

TOP WELLS GET ALL THE HEAT
AND DRY QUICKLY BEFORE BOTTOM
WELLS DRY POSSIBLY OVERHEATING
SAMPLES IN TOP WELLS WHEN THEY
DRY OUT

STRONG HEAT FROM SIDE

ALL WELLS HEATED EVENLY
FAST UNIFORM DRYING WITHOUT
OVERHEATING - EVAPORATIVE
HEAT LOSS BALANCED BY
UNIFORM HEAT INPUT

Heat on bottom of heavy frame

SIDE VIEW OF MICROTITRE PLATE

SIDE VIEW OF HEAVY ALUMINIUM SUPPORT

METHOD AND APPARATUS FOR DETERMINING TEMPERATURE OF AND CONTROLLING THE EVAPORATION OF LIQUID SAMPLES

RELATED APPLICATIONS

This application is a continuation of U.S. patent application Ser. No. 09/997,154, filed Nov. 28, 2001 now U.S. Pat. No. 6,878,342, which is a division of U.S. patent application Ser. No. 09/508,215, filed Mar. 8, 2000, now U.S. Pat. No. 6,605,474.

FIELD OF INVENTION

This application relates to the evaporation of samples comprising solid material dissolved or suspended in a liquid in a vacuum, and to improved methods for determining and controlling the temperature of such samples while they are evaporating. It is particularly applicable to monitoring samples in and control of centrifugal evaporators.

BACKGROUND TO THE INVENTION

In centrifugal evaporators samples are usually held in glass or plastic tubes or, sometimes, in a large number of small wells in plastic blocks. The sample holders are spun so as to arrange for a considerable centrifugal force to be applied to them in a direction which forces the liquid to the lower part of the sample tubes to prevent any frothing or spitting of the liquid out of the sample tubes when a vacuum is applied. The spinning samples are held in a vacuum-tight chamber (referred to henceforth as "chamber") which is connected to a vacuum pumping device.

Evaporators of this type are well known and many types are available commercially. They all suffer from the difficulty of providing the latent heat of evaporation to the samples to allow evaporation at reasonably high speed without allowing the samples to reach temperatures which could damage or destroy the samples which are often thermolabile.

No heat can be provided by conduction because the samples are held in a vacuum but microwaves or radiant heat from a high temperature source (500°-3000° C.) can be used to provide the heat required for evaporation. Radiation from a low temperature source, e.g. the chamber walls at 40° C., is frequently used but it cannot provide sufficient heat for rapid evaporation of anything other than small samples of highly volatile solvents. The use of radiant heat and of microwaves is known. Microwaves can cause damage to some samples and in the known embodiments that use radiant heat, the heat has been applied in a manner in which samples are not heated uniformly so that some samples can be dry whilst others are still liquid. This causes overheating of the dry samples if the heat is maintained long enough to dry the last samples.

SUMMARY OF THE INVENTION

According to one aspect of the invention in a method of evaporating liquid samples contained in at least some of a plurality of individual sample holders which are mounted within a chamber and rotated during the evaporation process so that centrifugal force is exerted on liquid contained therein during the evaporation process, and wherein heat is supplied to the sample holders to heat the liquid therein whilst a pressure below atmospheric is maintained in the chamber in manner known per se, a temperature sensing device is located in or adjacent at least one of the sample holders to sense the temperature therein at least during the evaporation process and to generate an electrical data signal which is proportional to the sensed temperature, and a signal path is provided to convey the temperature data signal to electronic data signal processing means.

Typically the data signal processing means is located at the centre of rotation of the plurality of sample holders.

Conveniently the processing means converts the output of the sensor into a suitable form for transmission to an external receiver.

The processing means may convert the sensor output signals into digital or analogue signals by which a carrier signal is modulated to effect the said transmission.

Conveniently the transmitted signal constitutes a radio signal. This for example may be transmitted to a receiver located externally of the housing by means of an antenna which is located externally of the housing and is connected to the signal processing means by means of a conductor which passes through the housing wall via an insulating seal serving as a lead through.

Where the chamber wall does not readily transmit, or significantly attenuates radio signals, the radio signals from the signal processing means may be received by a stationary radio receiver located within the chamber and conveyed either as radio signals or after demodulation as data signals indicative of the temperature of the sensor, via a conductive path which extends sealingly through and is insulated from the chamber wall. Typically the signals are conveyed through the chamber wall as radio signals, for demodulation to produce the said data signals outside the chamber.

The carrier signal may be a beam of light and the modulation is such as to modulate the intensity of the beam. In this event the light signals may be transmitted through a window which is light transmitting and which forms an integral part of the housing wall, to enable the modulated light beam to pass to a stationary light responsive device located externally of the housing and which is adapted to convert the received light signals into data signals indicative of the temperature of the sensor.

Whatever form the carrier signal and transmission system takes, the data signal may be employed to drive an indicator which is calibrated to indicate sample temperature.

Likewise the data signal may be employed to control the source of heat heating the sample holders in the chamber.

Power for the processing means may be derived from a battery located within a housing within which the processing means is also located. The battery may be connected to the processing means by the closing of a motion sensitive switch which closes when the chamber rotates, and is disconnected therefrom by the opening of the switch when the chamber ceases to rotate.

Alternatively power for the processing means may be transmitted from a source located external to the housing to a receptor located within the housing which is connected to the processing means.

In a further alternative arrangement, power for the processing means may be supplied thereto from an external power source by means of a rotational electrical connection. Such a connection may comprise slip rings and conductive elements in contact therewith.

Preferably any rotational electrical connection is separated from vapours in the chamber by being located outside the chamber, or inside the signal processing means housing, and seals are provided around conductors leading between the signal processing means and the external electrical connection where they pass through the wall of the chamber or the housing.

Typically at least one of the conductors leading between the processing means and any external rotational electrical connection, extends through the hollow interior of a drive shaft which itself extends through a seal in the chamber wall and serves to rotate both the sample holders and the said housing within the chamber.

The drive shaft may itself be electrically conductive and serves as one of the conductive paths for the power to the signal processing means.

Preferably material from which the housing is constructed, is non-conductive as well as being inert in the presence of the vapours given off during the evaporation process.

A preferred material for the housing is polypropylene.

In a further arrangement relating to the supply of power to the signal processing means in the housing, power therefor is generated in a winding which rotates with the housing relative to a stationary magnetic flux.

The winding in or on the housing may be wound on soft magnetic material such as is employed to make transformer laminations. It may be mounted on a central spindle which rotates the sample holder in the chamber.

Typically the magnetic flux is produced by at least one permanent magnet which comes into close proximity with the winding during each rotation of the sample holder, and is located either inside the chamber and the winding is in or on or close to the housing, or is located outside the chamber and the winding is rotated around the interior of the chamber close to the wall thereof.

The sensor may be sheathed in an impervious inert material so that it will not contaminate the sample or suffer corrosion, and may for example comprise a thermocouple.

The sample holders are typically rotated at a speed of between 500-3000 rpm depending on the g-force required to be imposed on the sample and the radius at which the samples are rotated.

According to another aspect of the invention, centrifugal evaporating apparatus comprises a vacuum chamber, a plurality of sample holders for containing liquid samples to be evaporated, which are located therein for rotation about a generally vertical axis, heating means for heating the sample holders and therefore the liquid samples therein, temperature sensitive probe means located in or adjacent at least one of the sample holders, signal path means for conveying electrical signals from the probe means to a signal processing means located within the chamber, a transmitting device also within the chamber for transmitting signals to a receiver outside the chamber, signals from the signal processing means being employed to modulate the transmitted signals so that when decoded by the remote receiver, the latter will provide a signal containing information about the temperature of the probe.

Typically the transmitting device transmits radio signals which the receiver is adapted to receive.

The signal processing means is preferably housed in a leak-tight housing to protect the electronic components making up the processing means from pressure fluctuations and from the vapours arising from evaporation in the chamber.

The apparatus may comprise an indicating means calibrated to indicate temperature, and controlled by signals decoded by the said remote radio receiver, to indicate the temperature of the probe.

The heating means in the chamber may be such that its heat output is controlled by the magnitude of an electrical current, and current controlling means is provided adapted to control the said electric current to the heating means, and the decoding signal from the remote radio receiver containing the temperature information is employed to control the current controlling means and thereby the heat output from the heating means and in turn the temperature to which the probe and therefore the liquid samples are permitted to rise.

Power for the signal processing means may be provided from a battery which may be located in or externally of the housing containing the said processing means.

Alternatively power for the signal processing means may be provided from a power supply which remains stationary and is external to the housing containing the signal processing means and a path is provided between the power supply and the processing means for conveying power thereto as the housing rotates relative to the power supply.

Alternatively power for the signal processing means may be derived from relative movement between the stationary magnetic field of the flux which links with winding which rotates relative to the magnetic flux thereby to induce a current in the winding which is available to power the signal processing means.

The winding may be on a spindle on which the housing is mounted, and which rotates both the housing and the sample holders within the chamber, or on, or in the housing itself, or may be rotated by the spindle around a circular path inside the chamber close to the wall thereof, and the magnetic flux passes through the chamber wall to link with the winding as it travels around the interior of the chamber.

While the samples are evaporating, large amounts of heat can be coupled into the samples without danger of overheating, by maintaining the pressure in the vacuum chamber at a low level.

In most cases the sample liquid is made to boil and it will boil at a temperature determined by the pressure at the boiling surface of the sample.

Evaporative cooling therefore controls the temperature to a safe level provided the vacuum pumping system maintains the chamber pressure at a sufficiently low pressure, but as soon as the samples are dry, evaporative cooling stops and sample temperature can rise rapidly to unacceptable levels if the heat input is allowed to continue.

It is difficult to measure the sample temperature during an evaporation run because the sample is rotating in a vacuum chamber during the process, and the invention assists in solving this problem.

Thus measurement can be achieved as desired, by inserting a temperature sensor into one of the samples and connecting it to a suitable electronic processor and transmitter, preferably located at the centre of rotation of the sample holder.

This sensor can be a thin thermocouple sheathed in an impervious inert material such as PTFE so that it will not contaminate the sample or suffer corrosion.

The processor preferably amplifies and converts the output of the thermocouple to a digital or analogue signal, which is transmitted through the container, into the vacuum chamber, and is picked up by an external receiver.

Transmission of the thermocouple signal can be by means of a modulated electromagnetic signal or by a suitably modulated light or infra-red beam or by any other means which will allow external detection of the signal, the only requirement being that the chosen radiation can be transmitted through the container, and possibly also the chamber wall.

Other heat sensors can be used in place of a thermocouple, but a thermocouple is convenient because it can be made small.

Power can be supplied to the electronic circuitry by making the rotating drive shaft hollow and feeding conductors through the hollow interior and through suitable seals to the inside of the electronic container. The grounded outer part of the drive shaft may again be taken into the housing by means of a suitable seal. Power would still have to be fed to the conductors by means of slip rings or brushes, but this may be easier than methods which necessitate a rotating seal.

In cases where it is undesirable to place a sensor in an actual sample, it can often be arranged that a tube is left empty adjacent to other sample tubes, and if this is filled to the same level as the sample tubes, with a similar inert liquid, and subjected to the same heating, a temperature sensor placed in such a tube can give a good approximation to the actual temperature of the samples.

If such a blank tube is not available, an alternative location must be found in which to place the sensor close to the sample tubes in a position where it experiences temperatures close to those of the samples. For instance, in sample holders comprising a plurality of holes in a block of plastics or metallic material e.g. aluminium, in which samples are placed, a less accurate but nevertheless reasonable approximation to sample temperature can be obtained by placing the sensor in a separate hole in the same block in which the sample retaining holes are formed.

Alternative Approach

When the sample liquid is evaporating, the pressure in the evaporator chamber approximates to the vapour pressure of the liquid or liquids in the chamber at the temperature of the liquid or liquids concerned and the chamber pressure can therefore be used as an indication of sample temperature.

The invention therefore also provides a method of determining the temperature of evaporating liquid samples contained or comprising at least one rotatable component and contained in at least some of a plurality of individual sample holders which are mounted within a chamber and rotated during the evaporation process so that centrifugal force is exerted on volatile liquid contained therein, and wherein heat is supplied to the sample holders to heat the volatile liquid therein whilst a pressure below atmospheric is maintained in the chamber in manner known per se, which is characterised by the location of a pressure sensing device in the chamber, sensing the pressure therein at least during the evaporation process, generating an electrical pressure data signal which is proportional to the sensed pressure, conveying along a signal path the pressure data signal to electronic data signal processing means which is programmed inter alia with information relating to the volatile component or components present in the samples, to convert the pressure data signal to a temperature value equal to that which equates to the measured vapour pressure for the known volatile component or components present.

The data signal processing preferably includes the step of addressing a look-up table containing temperature and pressure values for different liquids, and the further step of identifying to the signal processing means the volatile component or components present in the samples.

In addition or alternatively the data signal processing means may include an algorithm, and memory means, and the method involves the step of storing numerical values for insertion in the algorithm depending on the volatile component or components present in the samples and the pressure determined by the pressure sensing device, to enable computation of the temperature to which the sample must have been raised for the particular pressure to be observed in the chamber given the presence of the volatile component(s) concerned.

The invention also provides a method of controlling the temperature to which the samples in a centrifugal evaporator are heated by heating means within a pressure chamber containing the samples, wherein the pressure within the chamber is determined by pressure sensing means, a data signal is generated proportional to the pressure, and energy to a heating means located within the chamber for heating the samples is controlled in response to the value of the pressure signal. The temperature determination may be as described in the preceding paragraphs, by computing temperature from the pressure measurement in combination with the identity of the volatile component or components in the samples.

The invention also provides a method of supplying heat to liquid samples in a pressure vessel in a centrifugal evaporator which are contained in a plurality of tubular containers which during centrifuging in the pressure vessel are swung from a generally vertical condition to a generally horizontal condition under the influence of increasing centrifuge forces so that centrifugal forces are exerted on the liquid in the tubular containers as the pressure within the chamber is reduced, wherein radiant heat is directed towards the closed ends of the tubular containers whilst in their generally horizontal condition thereby to achieve more uniform heating of the liquid samples.

There is also provided another method of heating liquid samples contained in a centrifugal evaporator, wherein the samples are contained in a fixed regular array and more of the heat is directed to samples located in the central region of the array than is directed to samples around the periphery of the array.

In any of the aforementioned methods or apparatus, the heat source may comprise a source of infra-red radiation.

Where the heat is infra-red radiation, a heat absorbing screen is preferably located between the source of infra-red heat and the samples, having a plurality of radiation conductive regions therein, each conductive region aligning with the position of one of the samples in the array of samples, and the thermal transmissivity of the regions increase towards the centre of the array so that samples located in the central region of the array receive more radiation per unit time than those in peripheral regions of the array.

In any of the methods and/or apparatus described herein, the samples may be contained in an array of tubes, bottles or vials held in holders which uniformly swing upwardly from a vertical position to a generally horizontal position during rotation of a platform on which they are mounted, or in wells in a microtitre plate which can also be swung upwardly as aforesaid.

In any of the methods and/or apparatus described herein, the source of heating may be situated at one radial position relative to the axis of rotation of the sample containers, and each sample is subjected to radiant heat energy as it passes the source of heat during its rotation around the said axis of rotation, or alternatively the source of heat may extend around an arcuate path extending around some or all of the circular path of the samples, so that the exposure of each sample to radiant heat is for a greater percentage of its circular path than if the heat source is located at only one point around their path.

The invention also lies in a method of controlling the heating of liquid samples in a plurality of individual sample holders in a centrifugal evaporator wherein the samples are mounted for rotation within a vacuum chamber, the pressure of which is reduced during the evaporation process, wherein heating means is located in the chamber for heating the samples and control means is provided for controlling power to the heating means, and temperature signals from one or more probes, or a signal from a pressure sensor which detects the pressure within the chamber, are supplied to the heating control means, which is programmed to provide a high heat input during early stages of the evaporation process and smaller heat input during later stages of the process as the liquid within the samples is evaporated. In this way excessive overheating of dry material left within a sample holder after evaporation is complete and which is no longer subjected to the cooling effect of evaporating liquid within the sample, can be avoided.

The invention also lies in a method of controlling the heating of samples within a centrifugal evaporator wherein the samples are contained within a pressure vessel which is progressively evacuated by a vacuum pump so as to assist in the evaporation of the liquid from the samples, wherein a vapour condenser is employed to increase the pumping speed to protect the vacuum pump from vapour emitted during the evaporation process and wherein there is provided means for measuring vapour flow rate, and method of control involves controlling the energy to the heater in response to a signal derived from the flow rate measurement such that as the flow rate decreases, the heating energy is decreased, and as the vapour flow rate approaches zero, indicating that the samples are all dry, the heat energy is shut off.

The invention also lies in a method of supplying heat to a plurality of samples in each of a plurality of sample plates, each plate containing a plurality of wells or other liquid containing devices, each capable of containing one liquid sample, wherein the sample plates are supported on trays of material having a high thermal conductivity, and the trays themselves are supported within, and have a good thermal path to and from, a support frame also formed from high thermal conductivity material, and heat is supplied to the support frame from which it is conducted by the thermal path to the trays and thereby to the samples plates and samples contained therein. The heating may be effected by infra-red radiation directed towards the said support frame.

The invention also lies in apparatus for supporting microtitre plates, each containing a plurality of liquid samples, for evaporation in a centrifugal evaporator, wherein heat is supplied to the microtitre plates via a supporting frame and via trays extending thereacross on which the microtitre plates are located, the trays and the frame being formed from a material having a high thermal conductivity, and wherein the region of each tray on which a microtitre plate is located, is formed with an upstanding region defining a platform adapted to engage a recessed underside of the microtitre plate located thereon, which would otherwise be spaced from the surface of the tray, thereby to improve the transfer of heat between the tray and the plate.

Typically the frame and the trays are formed from aluminium or copper.

DESCRIPTION OF THE DRAWINGS

The invention will now be described by way of example, with reference to the accompanying drawings in which.

DETAILED DESCRIPTION OF THE INVENTION

The invention will now be described by way of example, with reference to the accompanying drawings comprising FIGS. 1 to 8.

Figure 1:
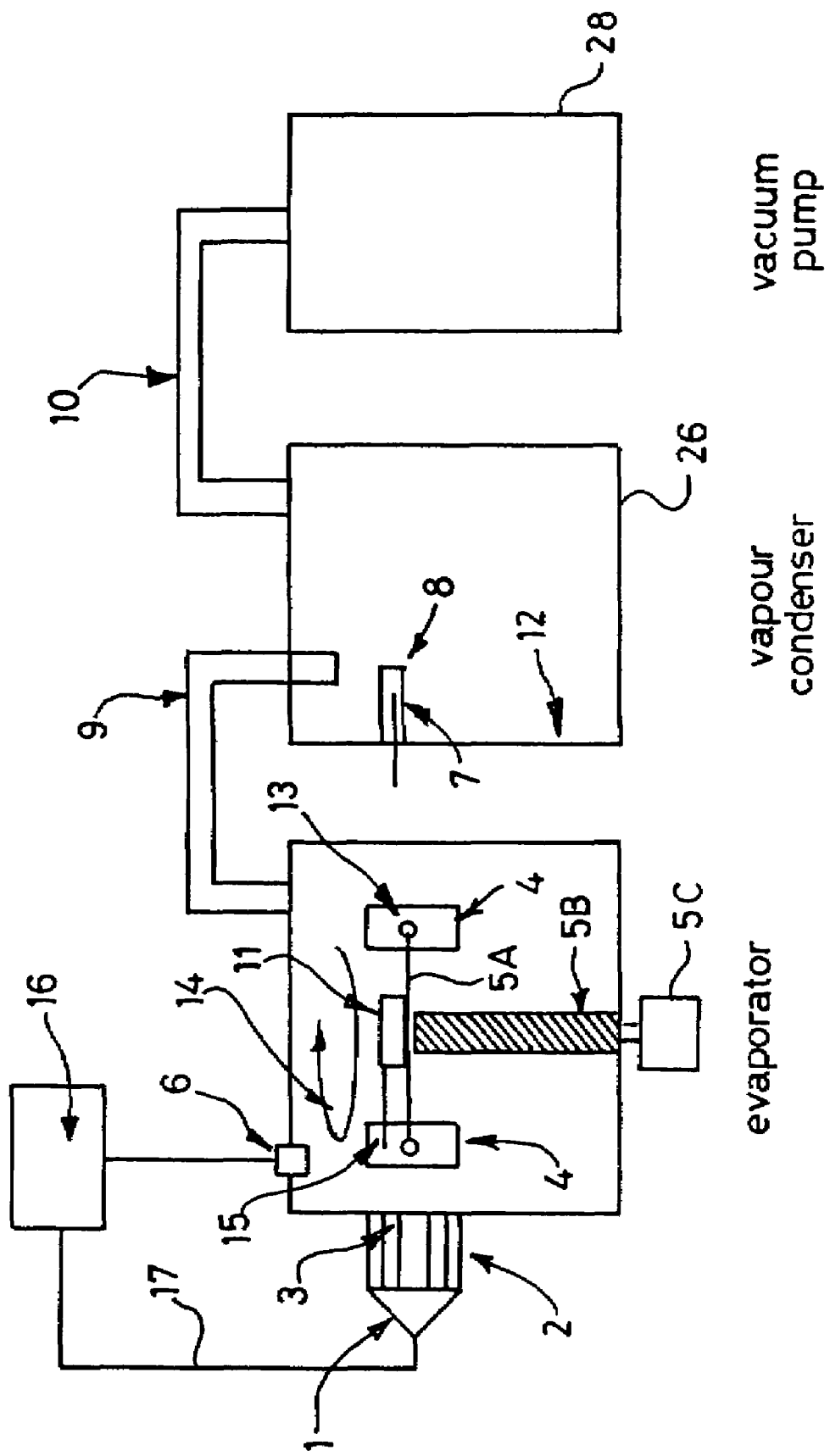
FIG. 1 illustrates a centrifugal evaporator embodying the invention described and claimed herein.

FIG. 1 illustrates a centrifugal evaporator embodying the invention described and claimed herein.

The samples in FIG. 1 are contained in blocks (4) in which there are numerous sample wells (not shown), commonly referred to as deep well microtitre blocks.

When the sample holder rotor 5A and shaft 5B rotates, driven by a motor 5C, which may be inside but more usually external to the chamber (14), the sample blocks swing out to the position illustrated in which the sample wells are horizontal, under the influence of centrifugal force.

The sample blocks are connected to pivots (13) and the blocks are held with the wells vertical for loading into a stationary evaporator. Vacuum is then applied to the evaporator chamber (14) via pipe (9) from the vapour condenser which in turn is pumped via pipe (10) by the vacuum pump.

Heat is applied to the rotating sample blocks (4) by a high temperature infra-red radiation source (1), and radiant heat energy (2) passes through a window of heat-transparent material such as quartz which is sealed into the wall of the vacuum chamber (14) and reaches the sample holder as illustrated.

A temperature sensor or probe (15) is placed in one of the sample wells, or otherwise placed in close proximity to the wells in one of the sample blocks, and is connected to transmitter (11) which transmits signals corresponding to the sample temperature to an aerial and feedthrough (6) inside and extending through the chamber wall, and which is connected to a receiver and decoder (16). This includes data processing and computing facilities as required, and indicates the sample temperature by a display (not shown) and, if required, can be programmed to generate electrical signals to control the operation of the heater increase or decrease the heat energy to keep the samples at desired temperatures during the process. Such control signals are supplied to the heater via path 17.

Sample Temperature Uniformity

It is important that as far as possible all the samples are evaporate at the same rate. To achieve this all samples should receive the same heat input by directing the heat to them, so as to heat all the sample containing tubes uniformly. A common form of sample holder is a deep-well microtitre plate (20), in which typically there are 96 wells.

The plate is mounted on swivel pins (not shown in FIG. 2) so that when it is initially loaded onto a stationary rotor 5A the open ends of the wells face upwards, but as soon as the rotor 5A is rotated at a sufficient speed, the plates or blocks (4) swing into a position in which the wells are horizontal, as is in fact shown in FIG. 1, and in FIG. 2.

Figure 2A:
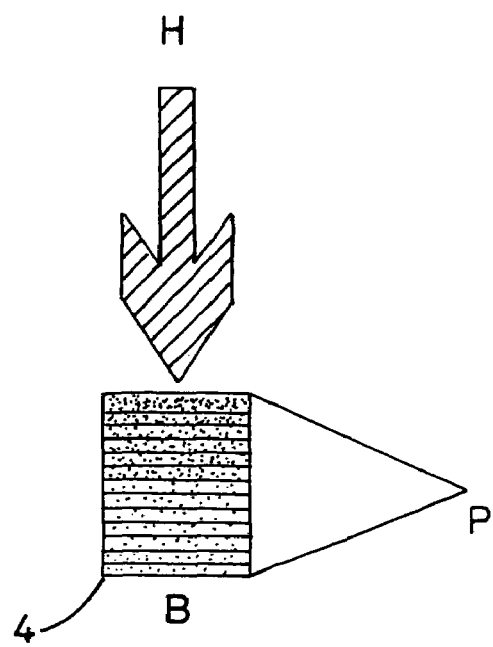
FIG. 2a depicts the strong infrared radiation from above.

It is known and convenient to apply radiant heat from the top of the chamber as illustrated in FIG. 2a, (or from the bottom) but this does not provide for uniform heating of the wells when they are horizontal. This is partly because most of the heat is in the infra-red region which does not significantly penetrate plastic material from which holders are constructed. The top wells are therefore strongly heated whilst the lower wells get little heat. This can cause overheating of the top samples before the middle or lower samples are dry.

Figure 2B:
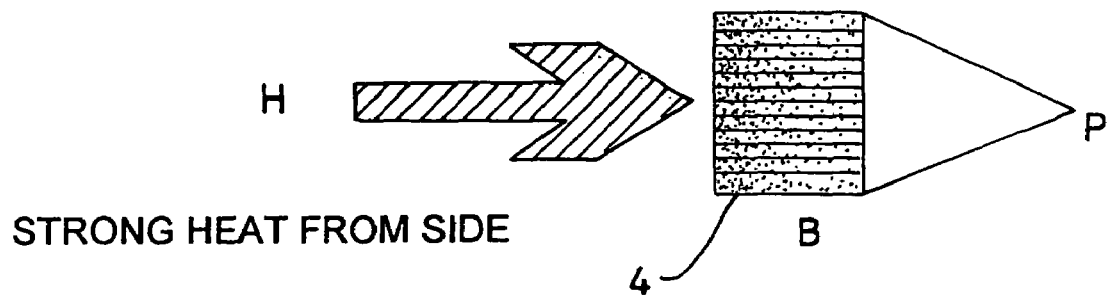
FIG. 2b depicts the strong heat from the side.
Figure 3:
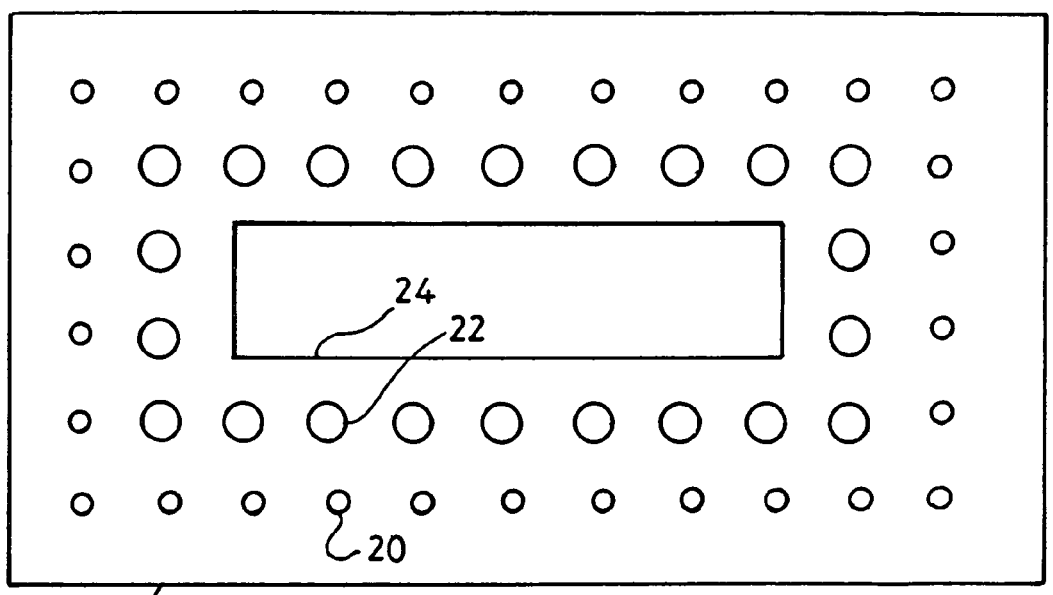
FIG. 3 depicts a metal screen that is located between the sample holders and the heat source.

In accordance with one aspect of the invention, the infra-red beam is directed horizontally onto the closed ends of the sample wells as in FIG. 2b, in which configuration it is possible to achieve uniform heating of the wells.

Cold Neighbour Effect

Even with perfectly uniform heat input the samples will not evaporate at a uniform rate because of "cold neighbour effect". If the samples are in thermal contact with each other as is the case for example in a microtitre plate or block (4), the outer samples only have evaporating (and therefore "cold") neighbours on three or (corner samples) two sides, and therefore do not lose as much heat to their neighbours as those in the centre which have four "cold" neighbours. Also two of an outside sample's neighbours will generally be less cold than those of the inner samples. Outside samples therefore can evaporate faster than centrally located samples.

As provided by another aspect of the invention, this effect can be reduced or eliminated by reducing the heat input to the outer samples, and in the (preferred) infra-red heating case, a simple way of doing this is to provide graduated shading from the infra red beam by, for example, placing a metal screen 19 (see FIG. 3) between the sample holder and the heat source. The screen contains graduated perforations 20, 22, 24, so that those in the outer region transmit much less radiation than do those in the central region, and those in intermediate regions, such as 22, which have an intermediate size thereby transmit greater quantities of heat than do the outer ones 20. The inner opening 24 allows an uninterrupted path for radiation to the centre of the array of sample holders.

Although the sample holder (4) illustrated is described as being a deep-well microtitre block or plate, the same techniques may be employed to obtain uniform temperature and graduated heating as described above, when using arrays of tubes, bottles or vials in holders which swing out on swivels in a similar manner.

Heating Control

As provided by one aspect of the invention, the heater power is controlled by measuring sample temperature or chamber pressure and taking appropriate steps to raise or lower the heater power. Thus at the start of the process a high heat input is required but as the samples approach dryness the evaporation rate will reduce and the sample temperature will start to rise so that the heat input must be reduced to avoid overheating the sample, and when the samples are dry, the heating must be discontinued.

Vapour Flow

A vapour condenser is shown at 26 in FIG. 1. These devices are used in centrifugal evaporation equipment to increase pumping speed for the liquid being evaporated and to protect the vacuum pump 28 from vapours which might impair its efficiency. Such condensers are vessels held at low temperatures at which the vapours being evaporated condense or solidify.

If a vapour condenser 26 is located between a vacuum pump 28 and an evaporation chamber 14 as shown in FIG. 1, the pressure in the chamber 14 cannot be reduced below the vapour pressure of any condensed liquid remaining in the condenser 26. This is due to the evaporation of condensed material which will take place in the condenser if the system pressure is reduced to a level approaching the vapour pressure of the condensed a material left in the condenser 26. This phenomenon, especially if a more volatile material has been left in the condenser 26 from a previous run, can make chamber pressure a rather insensitive technique for sensing sample temperature at the end of evaporation to indicate when the samples are dry, and it may be unreliable as a means for determining when the equipment can be shut down.

According to another aspect of the invention, the measurement of vapour flow rate has been proposed as a more useful monitor of the evaporation process.

By monitoring flow rate information can be obtained about a process to indicate when to turn off the heater, since when the samples are nearly dry the flow rate will become low. This enables equipment to be reliably shut down when the process is finished (i.e. the samples are dry).

Flow rate through the condenser or the pipe 9 between the chamber 14 and the condenser 26 can be monitored by any convenient technique.

Heating Multiple Sample Blocks

In some cases several microtitre plates or blocks can be stacked either directly one above the other, or on thin separating shelves or trays, normally made of stainless steel, and located as a stack in the evaporator.

Such arrangements are known but they suffer from the disadvantage that infrared energy cannot be applied evenly to all the wells in the plates or blocks. If it is applied directly to the bottom of an assembly of plates or blocks stacked above each other as described, the lowest layer of wells will be heated evenly but little if any heat will penetrate to layers of wells in plates or blocks above it. If it is applied to the base of a holder having thin stainless steel walls, base and shelves, heat conduction to the higher shelves will again be poor and the wells in upper plates or blocks will receive less heat than those in lower ones.

Stacked plates can be heated more uniformly if they are supported on relatively thick trays of a material having a high thermal conductivity, such as aluminium or copper, which in turn, are connected to a thick frame also made of similarly high thermally conductive material with a good thermal connection between the trays and the frame, and the latter is heated by the infra red radiation.

Figure 4:
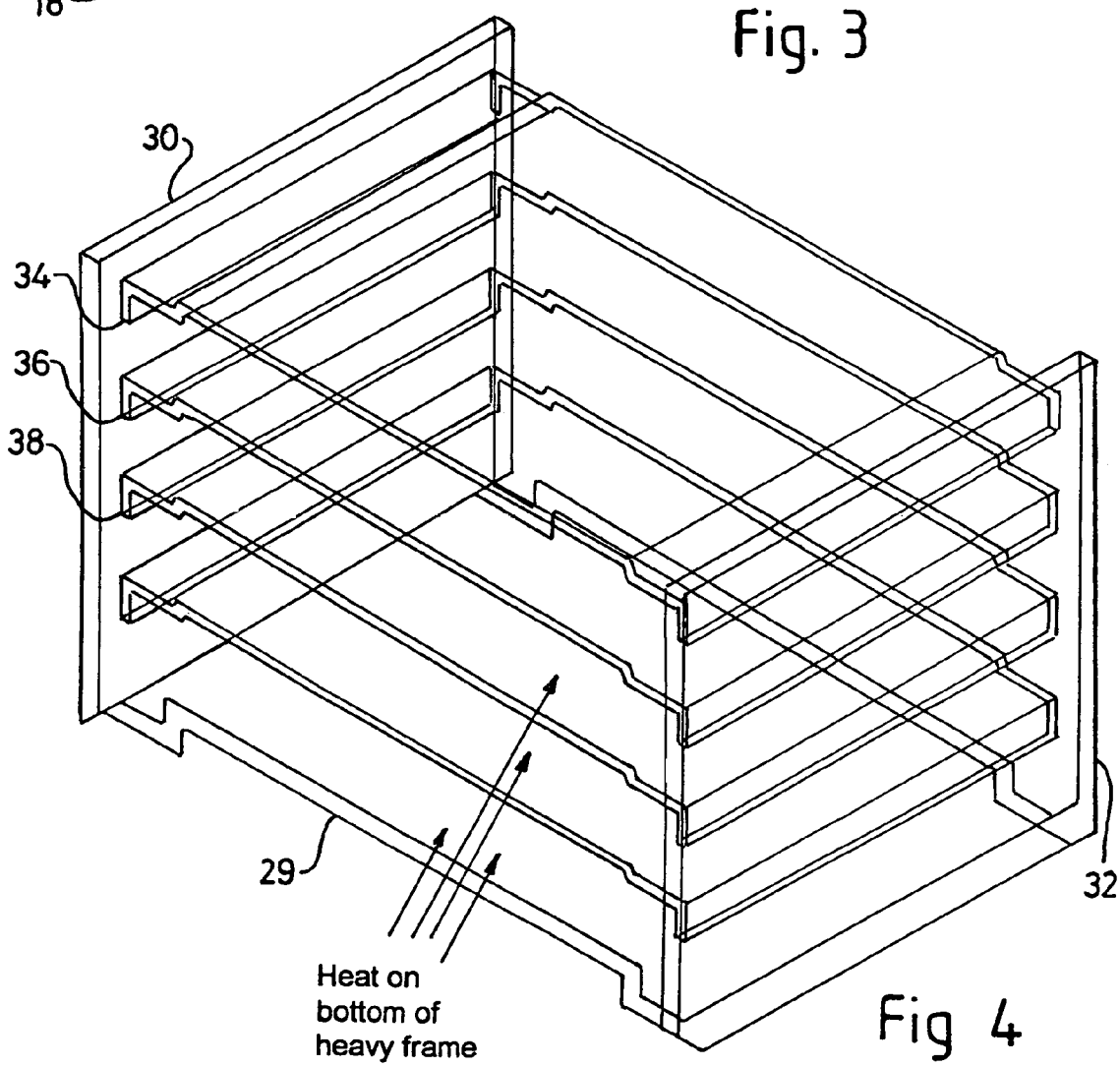
FIG. 4 depicts an arrangement of shelves or trays.

Such an arrangement of shelves or trays is shown in FIG. 4. This is formed from a heavy aluminium base 9 and similar heavy aluminium ends 30, 32 (the later being shown as transparent in the Figure) with trays 34, 36, 38 etc. spanning the gap between the ends 30, 32.

In the arrangement illustrated in FIG. 4, heat has been found to be distributed evenly to all of the plates, if the thickness of the supporting trays 34, 36, 38 etc is in the region of 2 mm, and the base and ends 29, 30, 32 are of a similar, or greater, thickness.

Figure 5:
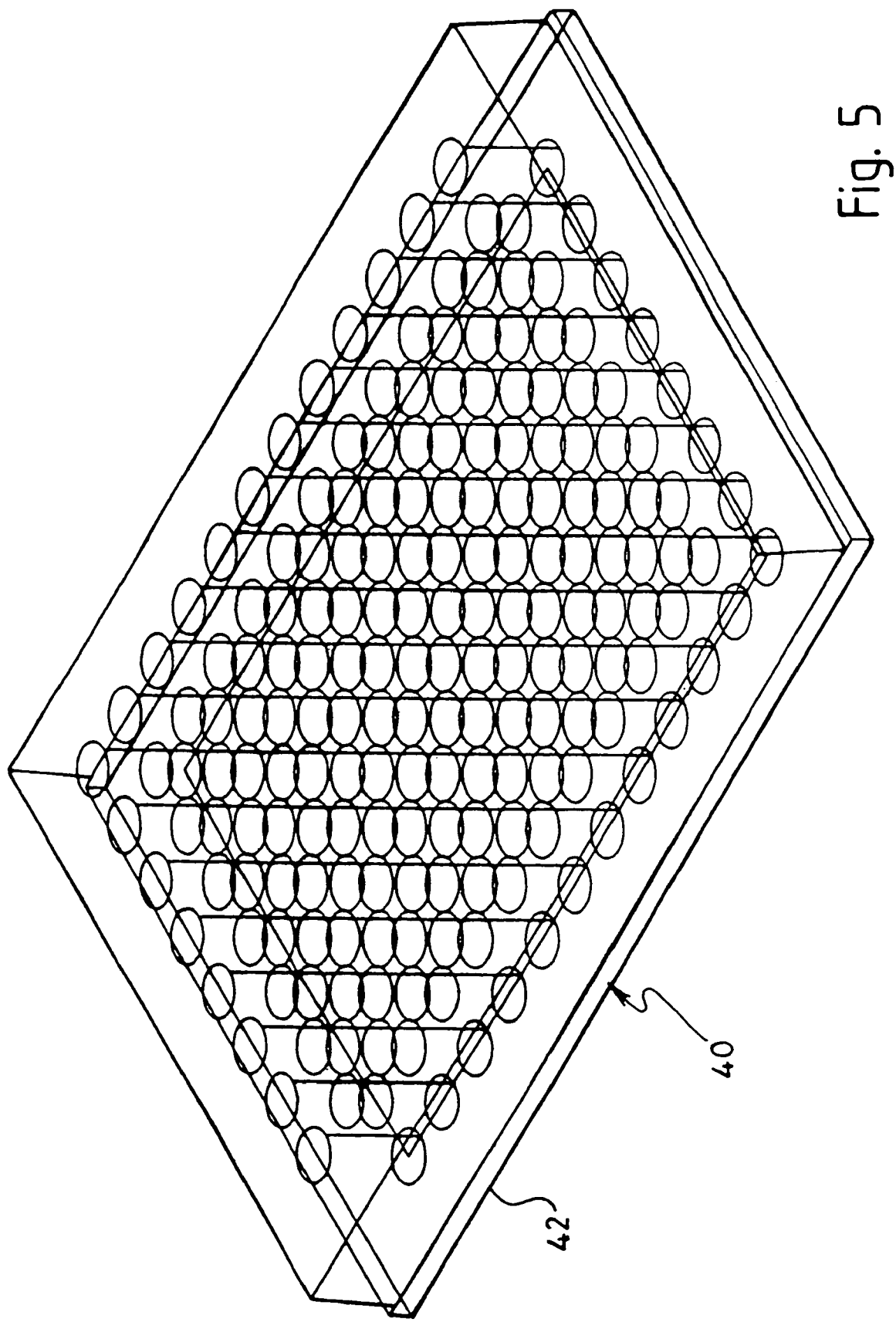
FIG. 5 illustrates a microtitre plate.

As illustrated in FIG. 5, most microtitre plates 40 have a vertically extended downwardly protruding outer edge 42, and, if they are supported on a flat tray, a small gap of a few mm will exist between the supporting tray and the underside of the microtitre plate, and therefore also the bottoms of the wells.

Figure 6:
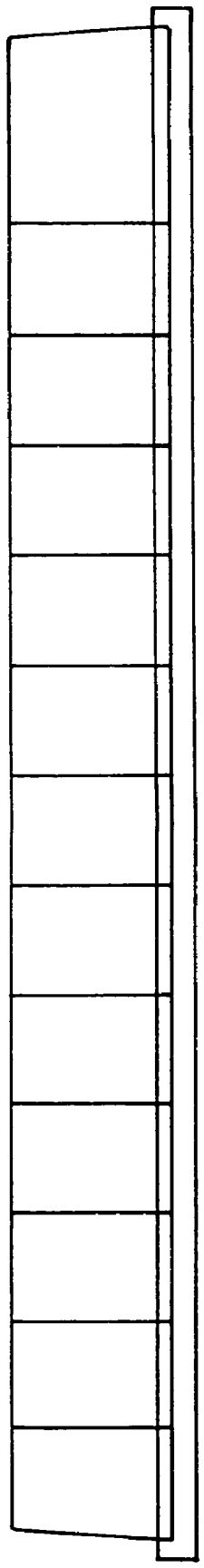
FIG. 6 illustrates a side view of a microtitre plate above an aluminum support.
Figure 6:
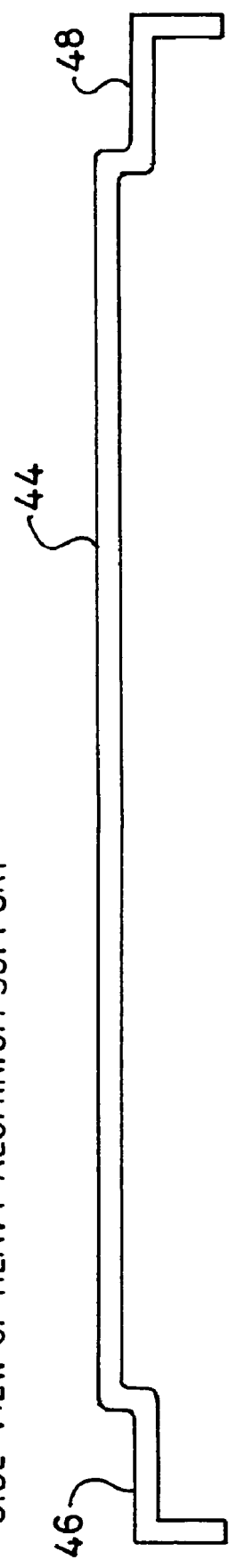

If each supporting tray is shaped as shown in FIG. 6 so that when viewed in elevation as in FIG. 6, its central area 44 is stepped relative to its periphery, or at least both ends 46, 48 this gap will be reduced or eliminated and better heat transfer from tray to plate/wells occurs, leading to faster evaporation.

Figure 7:
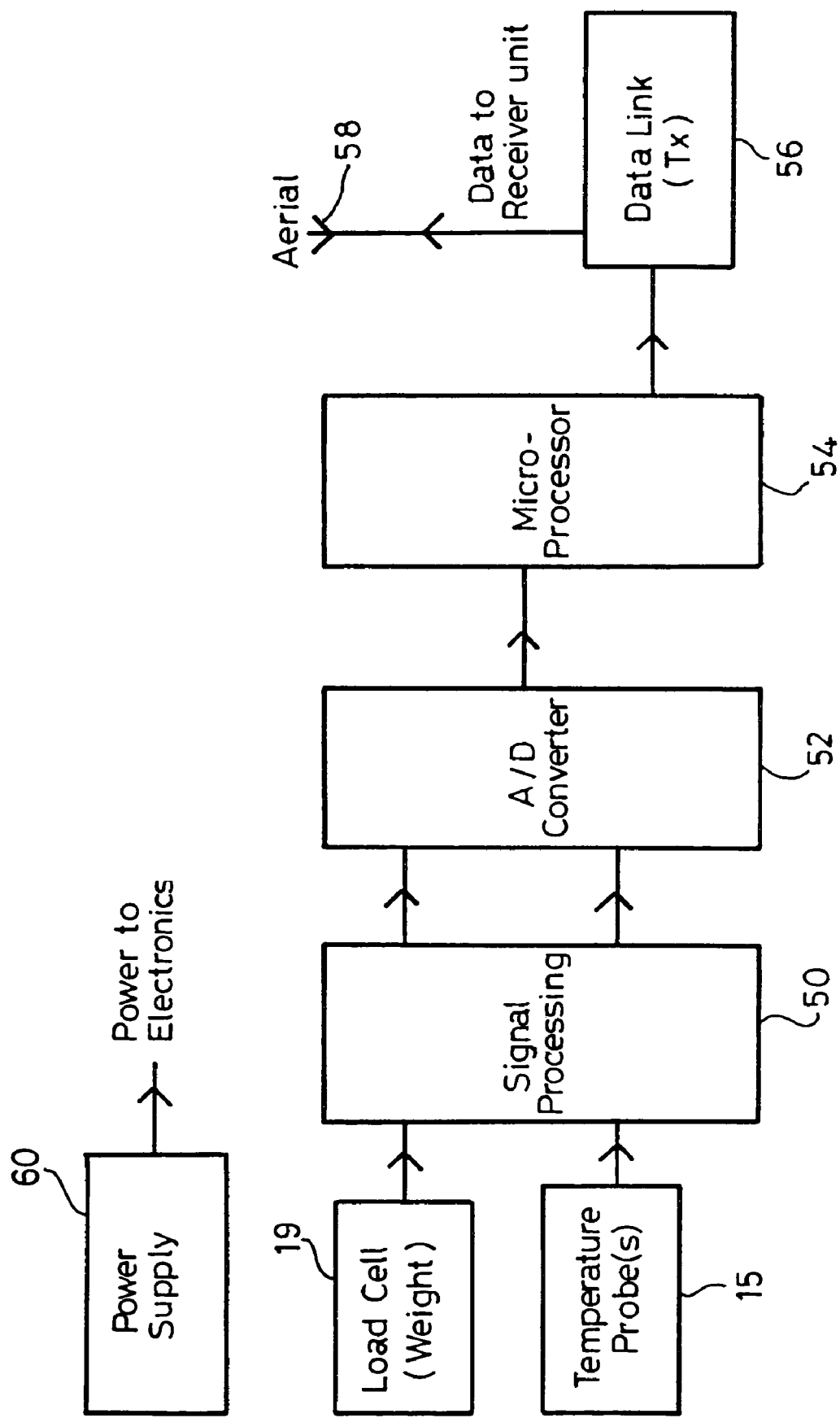
FIG. 7 shows the monitoring system for the chamber shown in FIG. 1.

FIG. 7 shows the important components of the monitoring system for a chamber such as shown in FIG. 1. Each probe 15 connects to an input of a signal processor 50, the output of which is digitised by an A/D converter 52 for supply to a microprocessor 54 which handles the modulation of a radio signal in a transmitter 56 to which signals are supplied from the microprocessor for radiation by an antenna 58. A power supply 60 may comprise a battery. Except for the probe 15 and antenna 58, all the units shown in FIG. 7 may be housed within a housing located on the sample holder rotor 5A.

So that there is no relative movement between it and the probe 15, the chamber 14 must be constructed so that at least part of its wall is capable of transmitting the radio signals from the antenna.

Figure 8:
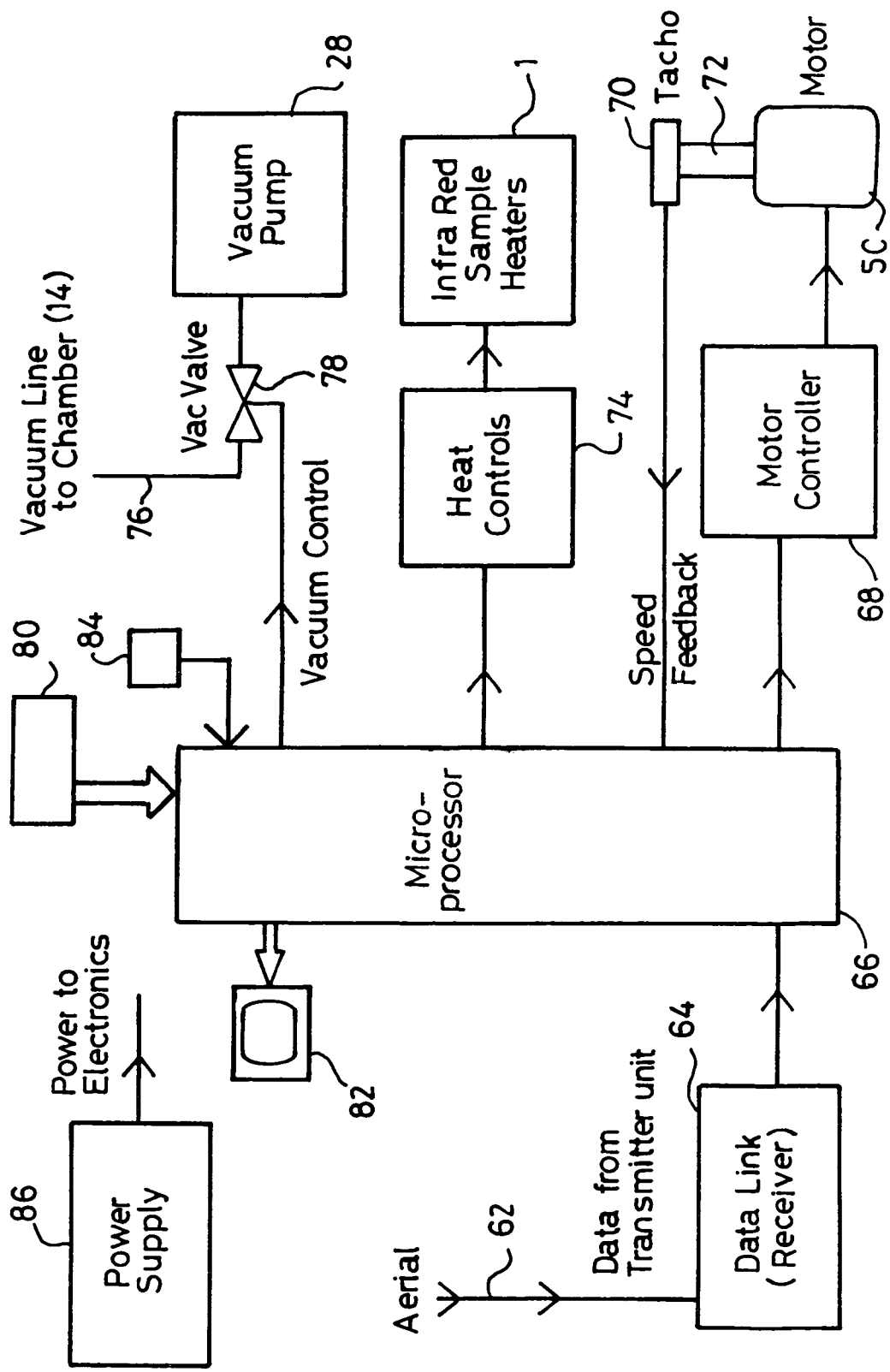
FIG. 8 shows the system according to the invention.

A receiver and control system for locating outside the chamber 14 is shown in FIG. 8.

Here a receiver antenna 62 feeds radio signals to a receiver and decoder 64 which supplies decoded digital data signals (corresponding to those from 52 in FIG. 7), to a second microprocessor 66. This controls the supply of digital signals to a motor controller 68 which controls the speed of rotation of the drive motor 5C (also shown in FIG. 1). A tachogenerator 70 is attached to the motor shaft 72 and provides a speed signal for the microprocessor 66.

An infra-red heating 1 (see also FIG. 1) is controlled by a power controller 74 which in turn is controlled by signals from the microprocessor 66, to reduced the heat output from 1 as an evaporation process progresses, so as to reduce the risk of overheating as samples dry and are no longer cooled by evaporative cooling effects.

The vacuum pump 28 of FIG. 1 is shown associated to the chamber 14 via a pipeline 76 which includes a valve 78 also under the control of signals from the microprocessor 66. The latter includes memory in which operating system software and data relating to different volatile liquids are stored and a data entry keyboard or other device 80 allows data to be entered initially and volatile components to be identified to the system. A screen 82 assist in the entry of data and the display of monitored values of temperature from probe 15 and pressure for a probe 84 in the chamber.

Power from the system of FIG. 8 may be from a battery or mains driven power supply 86.

The invention claimed is:

1. A method of evaporating liquid samples contained in at least some of a plurality of individual sample holders which are mounted within a vacuum chamber and rotated during the evaporation process so that centrifugal force is exerted on liquid contained therein during the evaporation process, comprising the steps of supplying heat to the sample holders to heat the liquid therein while a pressure below atmospheric is maintained in the chamber, locating a temperature sensing device in or adjacent at least one of the sample holders for rotation therewith to sense the temperature therein at least during the evaporation process, generating an electrical data signal which is proportional to the sensed temperature, and conveying the temperature data signal via a signal path to electronic data signal processing means.

2. A method as claimed in claim 1 wherein the data signal processing means is located at the centre of rotation of the plurality of sample holders.

3. A method as claimed in claim 1 wherein the processing means converts the output of the sensor into a suitable form for transmission to an external receiver.

4. A method as claimed in claim 3 wherein the processing means converts the sensor output signals into digital signals by which a carrier signal is modulated to effect the said transmission.

5. A method as claimed in claim 3 wherein the processing means converts the sensor output signals into analogue signals by which a carrier signal is modulated to effect the said transmission.

6. A method as claimed in claim 3 wherein the transmitted signal constitutes a radio signal.

7. A method as claimed in claim 6 wherein the radio signals are transmitted to a receiver located externally of a housing for said electronic data signal processing means by means of an antenna which is located externally of the housing and is connected to the signal processing means by means of a conductor which is passed through the housing wall via an insulating seal serving as a lead through.

8. A method as claimed in claim 6 wherein the chamber wall does not readily transmit, or significantly attenuates radio signals, and the radio signals from the signal processing means are received by a stationary radio receiver located within the chamber and conveyed either as radio signals or after demodulation as data signals indicative of the temperature of the sensor, via a conductive path which extends sealingly through and is insulated from the chamber wall.

9. A method as claimed in claim 8 wherein the signals are conveyed through the chamber wall as radio signals for demodulation to produce the said data signals outside the chamber.

10. A method as claimed in claim 4 wherein the carrier signal is a beam of light and the modulation is such as to modulate the intensity of the beam.

11. A method as claimed in claim 10 wherein light signals are transmitted through a window which is light transmitting and which forms an integral part of the housing wall, to enable the modulated light beam to pass to a stationary light responsive device located externally of the housing and which is adapted to convert the received light signals into data signals indicative of the temperature of the sensor.

12. A method as claimed in claim 4 wherein the data signal is employed to drive an indicator which is calibrated to indicate sample temperature.

13. A method as claimed in claim 3 wherein the data signal is employed to control the source of heat heating the sample holders in the chamber.

14. A method as claimed in claim 1 wherein power for the processing means is derived from a battery located within a housing within which the processing means is also located.

15. A method as claimed in claim 14 wherein the battery is connected to the processing means by the closing of a motion sensitive switch which closes when the chamber rotates and is disconnected therefrom by the opening of the switch when the chamber ceases to rotate.

16. A method as claimed in claim 1 wherein power for the processing means is transmitted from a source external to the said housing, to a receptor located within the housing which is connected to the processing means.

17. A method as claimed in claim 1 wherein power for the processing means is supplied thereto from an external power source by means of a rotational electrical connection.

18. A method as claimed in claim 17 wherein the rotational electrical connection comprises slip rings and conductive elements in contact therewith.

19. A method as claimed in claim 17 wherein the rotational electrical connection is separated from vapours in the chamber by being located outside the chamber, or inside the signal processing means housing, and seals are provided around conductors leading between the signal processing means and the external electrical connection where they pass through the wall of the chamber or the housing.

20. A method as claimed in claim 17 wherein at least one of the conductors leading between the processing means and the external rotational electrical connection, extends through the hollow interior of a drive shaft which itself extends through a seal in the chamber wall and serves to rotate both the sample holders and the said housing within the chamber.

21. A method as claimed in claim 20 wherein the drive shaft is electrically conductive and serves as one of the conductive paths for the power to the signal processing means.

22. A method as claimed in claim 16 wherein a material for the said housing is selected which is non-conductive as well as being inert in the presence of the vapours given off during the evaporation process.

23. A method as claimed in claim 22 wherein the material selected for the said housing is polypropylene.

24. A method as claimed in claim 16 wherein the power for the signal processing means is generated in a winding which rotates with the housing relative to a stationary magnetic flux.

25. A method as claimed in claim 24 wherein the winding is wound on soft magnetic material such as is employed to make transformer laminations.

26. A method as claimed in claim 23 wherein the magnetic flux is produced by at least one permanent magnet, which comes into close proximity with the said winding during each rotation of the sample holder, and is located either inside the chamber and the winding is in, or on, or close, to the housing, or is located outside the chamber and the winding is rotated around the internal of the chamber close to the wall thereof.

27. A method as claimed in claim 26 where the magnet is inside the chamber, and a protective coating is applied to the magnet to prevent it coming into contact with corrosive vapours in the chamber.

28. A method as claimed in claim 1 wherein the sensor is sheathed in an impervious inert material so that it will not contaminate the sample or suffer corrosion.

29. A method as claimed in claim 1 wherein the sensor is a thermocouple.

30. A method as claimed in claim 1 wherein the sample holders are rotated at a speed of between 500-3000 rpm depending on g-force required and radius at which the samples are rotated.

31. Method as claimed in claim 1 wherein the heat source is a source of infra-red radiation.

32. Method as claimed in claim 31, in which a heat absorbing screen is located between the source of heat and the samples having a plurality of radiation conductive regions therein, each conductive region aligning with the position of one of the samples in the array of samples, and the thermal transmissivity of the regions increases towards the centre of the array so that samples located in the central region of the array receive more radiation per unit time than those in peripheral regions of the array.

33. Method as claimed in claim 1, wherein the samples are contained in wells in a microtitre plate.

34. A method as claimed in claim 1, wherein the samples are contained in an array of tubes, bottles or vials held in holders which uniformly swing upwardly from a vertical position to a generally horizontal position during rotation of a platform on which they are mounted.

35. A method as claimed in claim 1, wherein the source of heating is situated at one radial position relative to the axis of rotation of the sample containers, and each sample is subjected to radiant heat energy as it passes the source of heat during its rotation around the said axis of rotation.

36. A method of heating as claimed in claim 1, wherein the source of heat extends around an arcuate path extending around some or all of the circular path of the samples.

37. Centrifugal evaporation apparatus comprising a vacuum chamber, a plurality of sample holders for containing liquid samples to be evaporated, said sample holders being rotatably mounted in said vacuum chamber, heating means for heating the sample holders and therefore the liquid samples therein, temperature sensitive probe means located in or adjacent at least one of the sample holders for rotation therewith, and signal path means for conveying electrical data signals proportional to the sensed temperature from the probe means to electronic data signal processing means.

38. Apparatus as claimed in claim 37 in which said signal processing means is located within the chamber and further comprising a transmitting device also within the chamber for transmitting signals to a remote receiver outside the chamber, signals from the signal processing means being employed to modulate the transmitted signal so that when decoded by the remote receiver, the latter will provide a signal containing information about the temperature of the probe.

39. Apparatus as claimed in claim 38 in which the signal processing means is housed in a leak-tight housing to protect the electronic components making up the processing means from pressure fluctuations and from the vapours arising from evaporation in the chamber.

40. Apparatus as claimed in claim 38 further comprising an indicating means calibrated to indicate temperature, and controlled by signals decoded by the remote receiver, to indicate the temperature of the probe.

41. Apparatus as claimed in claim 38 further comprising a heating means in the chamber for heating the sample holders whose heat output is controlled by the magnitude of an electrical current, and current controlling means is provided adapted to control the said electric current to the heating means, and the decoded signal from the remote receiver containing the temperature information is employed to control the current controlling means and thereby the heat output from the heating means and in turn the temperature to which the probe and therefore the liquid samples are permitted to rise.

42. Apparatus as claimed in claim 38 further comprising a battery for powering the signal processing means which may be located inside or outside the housing containing the said processing means.

43. Apparatus as claimed in claim 38 further comprising a power supply which remains stationary and is external to the housing containing the signal processing means together with a path between the power supply and the processing means for conveying power thereto as the housing rotates relative to the power supply.

44. Apparatus as claimed in claim 38 further comprising means within the chamber but external to the housing which generates a stationary magnetic field, and by the provision of coil means which rotates with the housing and which is linked by the said magnetic flux and which moves relative to the flux as the housing rotates relative to the chamber, thereby to induce a current in the winding which is available to power the signal processing means, and an electrical connection is provided between the coil and the power supply circuit in the housing.

* * * * *